Patented Sept. 19, 1944

2,358,760

UNITED STATES PATENT OFFICE 2,358,760

ADHESIVE SHEET MATERIALS

Raymond E. Reed, Norwood, Mass., assignor to The Kendall Company, Boston, Mass., a corporation of Massachusetts No Drawing. Application August 2, 1940, Serial No. 350,064

15 Claims. (Cl. 117—122)

This invention relates to adhesive tape products which are adapted for various uses as pressure-sensitive and other adhesive tapes, and to methods of manufacturing such goods.

It is the chief object of the invention to provide novel adhesive tapes which include backings composed of or including fibrous material and fabricated in such manner that the backings have particular internal and surface characteristics, adapting them, when combined with suitable adhesive masses, for general or for specialized adhesive tape uses, depending upon the individual product. Another object of the invention is the production of a tape for general use, with an unwoven backing material which is less expensive and better than usual woven textile backing materials, and is competitive from a price standpoint with paper tapes, yet one which may have properties of strength (wet or dry) and of moisture and solvent resistance far superior to present-day commercial paper tape. For specialized uses, tapes manufactured in accordance with this invention are an important contribution to the adhesive tape art and possess novel attributes, afforded for the most part by their distinctive internal and surface characteristics, both physical and chemical, which characteristics can be controlled, due to the methods of fabricating the tape. The preferred method has in fact universal application in the preparation of a variety of tapes, each individually adapted for specialized uses. For instance, the chemical characteristics of the tape, either internal, external, or both, may be such that the tape has special efficacy when used under conditions of heat or in the presence of moisture, or of other corrosive or discoloring agents—liquid, gaseous, or solid—such as solvents, acids, alkalies, or when used as electrical insulation. Likewise, the internal and external physical characteristics, or both, of the tape may be so controlled that an adhesive tape having special efficacy as a heat insulator, or as a sound insulator, may be produced. By a control of either the physical characteristics of the tape backing alone, or of the chemical characteristics alone, or by a combined control of both, various types of pressure-sensitive adhesive masses may be affixed thereto sufficiently firmly to permit repeated unrolling and rerolling of the tape without commercially detrimental "picking" of the adhesive, and to permit repeated reuse of the tape after initial application.

In its simplest adhesive tape form, the invention may comprise an adhesive-bearing structure composed of intermingled unspun or heterogeneously arranged fibers, bonded to each other in a controlled and predetermined manner to form a unitary coherent sheet material, but one having inherently different surface characteristics on its opposite surfaces provided by a control either of the kind of fibers adjacent one surface or of the concentration of fibers of one kind adjacent that surface, as compared with their concentration on the opposite surface, or as compared with the internal concentrations between the faces at any level, or both.

By reason of such control, a backing is produced which is inherently ideal for use as a pressure-sensitive adhesive tape, inasmuch as these characteristics are, or may be, fundamental in determining the adhesive receptive and retaining properties of the opposite surfaces of the backing, as well as such physical properties as strength, tear resistance, density, softness, drape, and porosity, and such chemical properties as resistance to external influences. The provision of a backing with such different surface properties permits its use with those types of pressure-sensitive adhesives which do not have greater affinity for surfaces to which they have been applied than they have, after application, to like external surfaces, although the backing is as readily adaptable to use with other types of adhesive which do, because of conditions of heat, pressure, or other mechanical or chemical influences at the time of application, have preferred adhesion to the interface even after application, as compared to their adhesion to external like surfaces.

A tape of this invention therefore has a sheet backing material which, in and of itself, has differential surface properties, or differential internal and surface properties, chemical or physical, or both, of the type herein described, without necessary resort to the use of primers, backing coats, dusting powders, or to the use of impregnation or other treatment of the backing structure after manufacture with chemical reagents to change its characteristics.

In one aspect, therefore, the invention relates to the production of a tape with a sheet backing which has the desirable characteristics of a back-coated or primed sheet material, insofar as its use as an adhesive tape backing is concerned, but which does not have the laminating tendencies encountered in coated or laminated backings, since, in the tape backing of this invention, there is no lamination nor any defined plane of cleavage.

The backing material which forms an essential part of the tape of this invention may be a fibrous structure, formed, in accordance with the preferred practice of the invention, by mixing fibers, as hereinafter described, in a plurality of separate batches, each of said batches consisting of fibers of predetermined character and in predetermined proportion, and some of the batches having, preferably, fiber content varying in the poportion of chemically or physically different fibers from other of said batches, and thereafter forming the batches into webs, each of the webs having, if desired, a different total number of fibers, and uniting the fibers in each web and uniting the webs in such manner as to produce a coherent unitary body or mass of predetermined strength, softness, resilience, flexibility, density, absorbency, fiber content, and fiber location.

In one form, the backing is characterized by a generally more porous and less dense surface on one side, having a preponderance of fibers of a given kind as compared with the opposite surface. For instance, fibers of different kinds may be mixed in suitable proportions, so when the separate webs are combined in the formation of the finished product, the fibers occur in different concentration on opposing surfaces. This permits the fabrication of a structure which will afford a greater intrinsic adhesion of a particular pressure-sensitive adhesive mass on one face of the backing than on the opposite face, thereby aiding in the production of a tape which may be rolled upon itself and unrolled without the use of an intermediate separator or slip sheet. Broadly, the structure of the combined webs may be maintained in a variety of ways. One satisfactory method includes impregnating the fibers with a suitable adhesive, either in liquid form, for instance latex, or initiallly in a powdered form, but activated by a solvent for the powdered adhesive or by heat. However, by the use of such a liquid or powdered adhesive in addition to the fibers, the chemical characteristics of the backing are influenced by the presence of the particular type of adhesive used. Furthermore, precision control of liquid or powdered adhesives is difficult. For these reasons, among others, we preferably avoid the use of a separate adhesive by preparing the backing, in one embodiment of the invention, from a mixture of non-binder textile fibers, of the usual character, such as cotton, wool, silk, or rayon, and of binder fibers having such coalescing properties under the action of re-agents or under specific conditions, to be further described, that the binder fibers act to maintain the unwoven web of binder and non-binder fibers in a unitary structure having the requisite flexibility, strength and coherency for use in the manufacture of adhesive tapes of this invention, whether the adhesive be of the pressure-sensitive, heat-sensitive or solvent-sensitive type.

In accordance with this invention, desirable backing materials can be made by mixing fibers potentially adapted to act as binders, even though normally not exhibiting such characteristics, with non-binder fibers, in separate batches, each batch containing a predetermined proportion of binder to non-binder fibers, and thereafter forming the separate batches into webs or bats, and then uniting the mixtures and bats through the action of some appropriate agent, such as heat, which serves to activate the binder fibers and thus to make them bond to the non-binder fibers and/or to each other. For example, textile fibers of cellulose acetate, suitable plasticized if desired, depending upon the particular type of subsequent binding operation, may be mixed and dry-assembled with cotton fibers in desired proportions in a carding machine, garnet, beater lapper, or some other machine adapted to mix the fibers commercially, and preferably, also, to work the mixture into the form of a web, bat or other fibrous body of the desired form, and perhaps of the desired dimensions. During this operation the different kinds of fibers become intimately commingled so that when this mixture is subsequently heated, or subjected to the action of some other softening agent for the cellulose acetate fibers, their normally latent adhesive, coalescent, or other binder characteristics are developed and they can then be made to adhere to, or to bond with, the cotton fibers, or to each other. Such action may be promoted by pressing the fibrous body while the binder fibers are still in a softened condition. These operations result in a firm bond between adjacent fibers throughout the backing, fibers in one preliminary web being interwined and intermeshed with fibers of an adjacent web or webs when the webs are brought together preparatory to the bonding step. The individuality of the separate preliminary webs thus substantially disappears and the coherency of the backing is enhanced by its final substantially non-laminar structure.

After the activating step has been completed, the fibers are so united that no substantial movement of them out of the relationship determined by the unifying step takes place. Thus, the resulting product has a strong resistance to physical and chemical disruptive forces. As will be seen, by this process, no specific arrangement or organization of the fibers is required, except initially to produce the intermingling necessary to distribute the binder constituent substantially uniformly through each batch, or to distribute the binder fibers in a predetermined manner.

If, however, some incidental orientation of the fibers occurs in connection with the mixing operation or the working of the fibrous mass into the form of a web or other shaped body, that factor is not objectionable from the standpoint of this invention. In fact, some such arrangement of the fibers usually occurs necessarily in performing this mixing operation in textile machines of the common forms. For example, a cotton card produces some parallelizing of the fibers and it should be understood that in the subsequent use of such term as "unarrayed," "unspun," or "heterogeneously arranged," it is intended to include carded or garnetted webs, or those made by other dry-assembling processes, in which either some intentional or some incidental parallelization or arrangement of the fibers may take place, these terms being intended to distinguish from spun, woven, braided, knitted, or similar structures, the integrity of which depends solely upon some specific arrangement of fibers or yarns. While some definite organization of fibers may be made for the purpose of this invention, such as a longitudinal orientation for obtaining a high lengthwise tensile strength per unit of weight or of density, the integrity of the product does not depend alone on such an arrangement but rather on the union or coalescence of the fibers. In this connection it may also be pointed out that while a card usually is fed from a lap previously made in a picker and the mixing of the fibers takes place largely in the latter, nevertheless a card is very useful in this process because of the fact that it works the mixture of fibers into a web admirably adapted for the subsequent coalescing operation.

A very considerable class of fibers, suitable for use as binders and desirable from the standpoint of adhesive tape use, is available. For example, various fibers comprising esters and ethers of cellulose, are suitable, such as those made of cellulose acetate, cellulose formate, cellulose propionate, cellulose butyrate, ethyl cellulose, and benzyl celluose. Fibers made of mixed esters, such as cellulose acetate-propionate, also are very useful. Others of an entirely different chemical nature, however, may be used, such as those made of vinyl polymers, such as poly-vinyl acetate, polyvinyl chloride, polyvinyl acetate-chlorides, and those of the polyamide type, an important example of which is that known commercially as nylon. The binder fiber in each card may be of a single kind or may be a mixture of different kinds of binder fibers. Such cards may be combined in the formation of the finished web with other cards which have a different kind or kinds of binder fiber, and perhaps occurring in different proportion, so that the binder fibers adjacent one surface have different chemical characteristics than the binder fibers adjacent the other surface or present intermediate to the surface cards. In fact, as many as three or more kinds of binder fibers may be present in the completed product, and may or may not be present in different proportion at different levels. The invention is not limited to any particular kind of binder fibers provided they have those characteristics suited to the purposes of the formation of the backing material. Necessarily, the particular kind or kinds of fibers used will be selected in accordance with the requirements of the contemplated use for the tape and the contemplated adhesive coating. For the usual types of water-insoluble pressure-sensitive adhesives, comprising either rubber-resin mixtures or rubber-substitute resin mixtures, a most staisfactory backing is one in which cotton fiber forms one constituent and a single kind of cellulose acetate binder fiber, either with or without a plasticizer, is used.

For the non-binder fibers, any of those commonly used in the textile industry may be employed satisfactorily, although here again, they will naturally be selected in accordance with the requirements of the particular backing to be made and in accordance with the contemplated adhesives to be united therewith. Cotton fiber, either bleached or unbleached, appears to be more commonly desirable than any other, but wool, silk, rayon of the regenerated cellulose type, such as viscose, asbestos, glass, the recent rubber fiber and others, or mixtures thereof either in the same or different cards, are entirely suitable for use in this process. It may here be pointed out, however, that fibers of certain kinds may act as binders under some conditions and as non-binder fibers under others. In other words, fibers of the same general chemical character may have different thermoplastic or other physical properties due, for example, to the fact that some of them have been treated with plasticizers so that they will soften at a lower temperature or will respond selectively to a softening or activating agent. Thus fibers of superficially identical chemical nature may be mixed, some of them serving as binder fibers while the others function as non-binder fibers.

It may also be observed that all the fibers above mentioned, both binder and non-binder, may be of the general nature of those used in the manufacture of textiles in textile machinery of common commercial types, and that, consequently, these fibers may aptly be called "textile fibers." It will be seen that the fact that the thermoplastic or binder fibers are of textile length, and have textile characteristics, as well as the cotton, wool, silk or other fibers with which they are mixed, is an important advantage of the present invention, for the reason that it makes it possible to mix the fibers and work them into the form of a fleece, web, or pad, in ordinary textile machines, such as pickers, cards, and other machinery, used in producing fibrous bodies of the type above mentioned, and to get the advantages of the resulting structure.

The invention presents wide opportunity for choice of fibers depending upon particular requirements of shrinkage, non-inflammability, strength, and moisture, temperature and solvent resistance of the finished adhesive tape.

For instance, in one aspect to the invention, the two external cards used in forming the backing may contain a higher number of fibers, a different proportion of binder fibers, or shorter fibers per unit of weight, than an internal card or cards, to provide a tape which will have a varying density in cross-section, with a somewhat fluffy interior structure to prevent transmission of heat, to absorb sound, or to act as a packing. Such a tape, having an internal structure high in, say, cotton non-binder type fiber content, and of a considerable thickness and bulk, finds use in metal construction as an interliner between metal panels, to prevent squeaks, to cushion moving parts generally, and at the same time to perform, if necessary, insulating functions. Where the internal characteristics include low density, and a pressure-sensitive adhesive is to be used, external webs or cards of high density and strength are indicated, in order to insure that the tape may be unrolled without causing lamination through the central area.

In other instances, where a tape having a permeable and moisture-retaining back surface is desired, the back cards may include a high proportion of non-binder, water-wettable fibers. In such cases, slip-sheeting may be required with pressure-sensitive adhesive coatings, as a soft, fluffy back surface may cause objectionable difficulties in removing the tape from a roll. Likewise solvent spreading of the adhesive, as distinguished from calendering of a viscous plastic adhesive, will probably be necessary.

At other times the tape may be fabricated with an eye to provide a back surface highly receptive to printers' and other types of inks.

On the other hand, moisture resistant backings may have, for example, a back card or cards high in binder fiber content of individual moisture resistant fibers, as of cellulose esters or cellulose ethers, and thus be made almost impermeable to water, and certainly highly resistant to moisture. The greater the non-permeability that is desired, the greater the concentration of non-water-wettable fibers should be made adjacent the outer surface of the tape.

Other types of resistance may be obtained. For instance, if a tape is being manufactured for use as a protective covering against acids or alkalies, polyvinyl ester fibers may be included in large percentage adjacent the external surface. High concentration of ethyl cellulose fibers would insure resistance and stability of the tape against strong alkalies and dilute acids. Other tapes can be made resistant to air impurities, such as sulphur dioxide and hydrogen sulphide, to preserve burnished surfaces, or can be made immune to bacteria or fungus growths by choosing initially fibers having these characteristics and incorporating them in high concentration adjacent the exposed back surface.

In some cases, and especially when a soft fluffy interior is desired, it may be advantageous to so construct the tape that, in its final cut form, it will have highly bonded edge portions. While this could be accomplished by utilizing a series of cards, in each of which the outer edge portions and/or spaced longitudinal panels are formed with a higher binder fiber content, for practical purposes it would be more convenient to feed as one of the webs forming a layer of the backing, individual widths of bats formed from separate cards, one of which cards is high in binder fiber content, so that the "card" which goes into the final product is a composite of separate alternating strips having different binder fiber content. The high binder fiber content areas can be so positioned as to lie along that section of the tape where the cutters will act. In this manner a final roll of tape of a small width will have edges of a highly dense and bonded nature, although the internal section of each individual cut tape width will contain a higher percentage of non-binder fiber. In similar manner, lateral areas, spaced longitudinally from one another, may have higher binder fiber content than intervening areas. Such tapes could therefore have binder fibers present in different proportions widthwise or lengthwise of the tape, or both, as well as in different proportions at different levels through the tape.

The operation of unifying the fibrous mass into a coherent structure should be controlled in accordance with the nature of the binder and non-binder fibers used, the proportions of such fibers and the characteristics of the final product desired. During the mixing step these fibers can be in a dry, free condition suitable for dry assembly, picking, carding or like processes. Consequently, the process of unification necessarily requires that the binder fibers be softened to a suitable degree. Any appropriate activating agent may be used which will produce this softening action. Those found most practical consist of heat, solvents or those substances, such as plasticizers, which exert a softening action, or some combination of the foregoing. Where the binder fibers are thermoplastic, having the property of being softened by heat and hardening upon cooling again, these changes in physical condition take place without any material chemical deterioration. Accordingly, a convenient method of effecting unification is to pass the combined cards through a heating chamber, between heated plates or heated rolls, or through any other suitable apparatus capable of raising the temperature of the fibers to the desired degree.

Where the binder fibers used are soluble in, or may be softened by, organic solvents which do not affect the non-binder fibers to any substantial degree, another method of producing the desired union of the fibers consists in subjecting the web, after it has been formed, to the action of such a solvent, or to a solvent vapor or gas, which will develop in situ the adhesive or bonding properties of the binder fibers without materially disturbing or changing their respective positions in the mass. For instance, if the web consists of a mixture of cotton and cellulose acetate fibers, it may be treated with a mixture of acetone and methanol to superficially dissolve or soften the binder fibers. The web may then be passed between pressure rolls. The nature of the solvents employed necessarily will be determined by the character of the binder fibers and other practical considerations. A wide variety of solvents for the various binder fibers above mentioned are known, including acetone, methyl alcohol, methyl cellusolve, propylene oxide, methyl acetate, ethyl acetate, acetic acid, diacetone, chlorobenzene, chloroform, toluol, carbon tetrachloride, and diethyl ether.

Whether or not pressure be used in the unification process will depend chiefly upon the nature of the binder and non-binder fibers used and of the character of the final product desired. Pressing necessarily results in bringing a single binder fiber into contact with a greater number of contiguous fibers of both kinds than otherwise would be the case and thus to increase the number of individual bonds with an accompanying increase in strength. It tends to reduce the softness, flexibility and draping qualities of the product and to give it greater firmness and rigidity. Whether to use pressure, and the degree of pressure to be employed, if it is used, therefore will depend upon the results desired, the nature of the binder and softening agent used and other practical considerations.

That the nature of the bonding, coalescence or association of the fibers with each other produced by the unification may take several forms will be evident from the character of the unification process herein described. All of these binder fibers have normally latent adhesive or other coalescent properties which may be developed and made active by any of the unifying agents above discussed. For example, in subjecting the mixed fiber web to a suitable temperature, the thermoplastic fibers will attain a softening stage which, in connection with the application of pressure, is sufficient to effect a unification. Or, the heating step may be carried further until the surfaces of the fibers become sticky, so that when the web is pressed the binder fibers will adhere or weld firmly to other binder fibers and may likewise adhere to the non-binder fibers with which they are in contact. Or, with some kinds of binder fibers, the heating step may be continued still further until the form of the binder is further broken down and the fibers are converted into almost a liquid state, in which case they will wet intersecting non-binder fibers and will unite them upon subsequent cooling. In any of these extremely soft conditions more or less spreading of the binder constituent may be effected, if desired, and even to such a point as to convert some or all of the binder fibers into a discontinuous or continuous non-fibrous film.

Various adhesive tapes can be made because the character of the adhesive tape product can be modified, varied, and controlled through the use of plasticizing agents in the composition of the binder fibers. Such agents are useful not only in facilitating the coalescing process per se and controlling the strength of the bonds, but also in modifying the physical characteristics of the binder fibers in the final product. Such properties as softening point, pliability, toughness, and the like, may be controlled in this way. Consequently, the nature and proportion of the plasticizer or plasticizers used can be selected in accordance with either or both of these requirements. In addition, the character of the final product can be modified or varied by the degree of pressure used in the bonding process, the temperature employed during this step, and by the length of time occupied by it. Plasticizers also may be used to modify any of these factors.

It should be clearly understood that it is not necessary to carry the softening action to such a point that the binder fibers will wet the non-binder fibers or will adhere to them in order to produce a unification entirely satisfactory for many purposes. A softening of the binder constituent to the point where it is plastic but not adhesive, when the pressure is applied, is sufficient for many purposes. Apparently the unification so effected is due to the deforming of the binder fibers while in a softened condition and in some cases the embedding of the non-binder fibers in them. Since the fibers are mutually entangled or interlaced throughout the mass, the act of embedding the non-binder fibers in the binder fibers effects a mechanical engagement of these constituents in such a manner as to produce a coherent body having ample tensile strength and flexibility for adhesive tape use. If the softening of the binder fibers is carried further so that they weld to each other, even though they may not actually adhere with any substantial degree of strength to the cotton or other non-binder fibers, a still stronger product is produced, apparently due to a firmer mechanical entanglement of the latter in the former, coupled with the embedding of a considerable proportion of one in the other. Here the binder material appears to form a three-dimensional network, maze or framework in which the non-binder fibers are intermingled, intertwined, interlocked, and, at some points, mechanically embedded or otherwise bonded.

Various combinations of this mechanical interlocking with a direct adhesion or welding of the fibers to each other can be produced. It will readily be appreciated that the different relationships which the two types of fibers may be made to assume with reference to each other in these ways has an important bearing on such physical properties as strength, pliability, drape, firmness, porosity, tearing properties and the like, and that they are correspondingly useful in controlling the nature of the final adhesive product. It should be observed that, especially in products having a relatively small per cent of binder fibers at any level, the individual fibers, at least those of the non-binder type, may have considerable freedom of movement relative to their neighbors, except at their points of union, bonding, or coalescence with the binder constituent. While an individual fiber below the surface of a web made by this method may have its freedom of movement restricted by the presence of neighboring fibers due to the density of a particular web, nevertheless if fibers of textile length are used, the fibers may not be bonded together in such way as they are in products which can be made by paper processes, and this relative freedom of the fibers is important in giving to some of the products of this invention characteristics similar to fabrics.

This fiber freedom may take extreme forms such that the product may have a very fluffy, napped, or long fibered surface on one side, by reason of a small binder fiber content, or by reason of the presence of fibers of greater length per unit of weight adjacent that surface. Sheet materials having one surface resembling outing flannel in general appearance may be produced by this method. The minimum proportion of binder fibers in such a card is relatively small, say three or four per cent, so that the physical characteristics of the final adhesive product, so far as these cards are concerned, will depend mainly upon the properties of the non-binder fibers. Also, with the fibers relatively long, only a small percentage of the fibers in an average batch of uncombed cotton staple as it comes from a carding machine being less than half an inch in length and running from that to one and a quarter inches or more, and since they may have only very few, say one or two, points of anchorage to the binder fibers at some points in some of these products, it is entirely feasible to make adhesive tapes which are very soft and pliable.

The bond, union, or other relationship of the fibers to each other produced by the various methods above described and which is relied upon mainly to give the final adhesive tape its stability and strength is frequently herein designated as "coalescence," and the methods of treatment as "coalescing," whether or not these terms are used in their strict or technical sense. Consequently, where such terms appear hereinafter they will be used to convey the meaning just described.

As above indicated, the strength of the fiber-to-fiber bonds may be increased when desired and the creation of such bonds may be facilitated by using binder fibers which have been treated with a plasticizing agent, or in which a plasticizer has been used in the composition of the fiber. The non-volatile solvents above mentioned are suitable for this purpose. Some of the synthetic resins, such as "glyptals," "vinyls," "santolites," "rezyls" and, in fact, any resin compatible with the material of the fiber used, also may be incorporated in the composition of the fibers to increase the strength of the fiber-to-fiber bond, or to alter otherwise the properties of the fibers.

One example of the production of a web of textile fibers in accordance with this invention, and unified by heat and pressure, is as follows:

A binder fiber having good thermoplastic properties should be selected, such as those prepared from ethyl cellulose, cellulose acetate, polymerized vinyl acetate, polymerized vinyl chloride, or mixtures of these, together with suitable plasticizers if desired. Binder fibers consisting of two parts of cellulose acetate and one part of para toluene ethyl sulphonamide may be used satisfactorily. The binder fibers may be mixed with cotton fibers in a picker and finisher lapper so that the proportion of binder fiber is, say, seven and one-half per cent. Such a lap may then be fed to a card which works the fiber mixture into the form of a web.

Other batches containing a higher proportion of binder fibers may be separately mixed in a picker and finisher lapper. For instance, four separate batches may be prepared, each containing sixty per cent or each containing different desired percentages of the binder fiber. Each of these laps is also fed to a card which works the fiber mixture into the form of a web. These five webs may then be fed together through a commercial textile 4-roll calender, in which the steel rolls are arranged in a vertical series and are maintained at a temperature of, say 300° to 350° F., with normal calendering pressures.

The web, say a 36" width, enters the nip of the two top rolls, passes around and between the two middle rolls, and finally through the nip of the two bottom rolls. A satisfactory speed is twelve yards per minute.

As will be seen, the finished coherent web produces a product which has a higher non-binder fiber content on one surface than on the other, a condition which will be readily apparent upon an examination of the product, which will show one surface having less dense, more porous characteristics with loose, free and unattached ends or neps of fibers protruding promiscuously therefrom and acting as a mechanical anchorage medium for a subsequently applied adhesive coating.

As can be readily understood, the proportion of non-binder to binder fibers may be varied in one single outside batch, or may be varied progressively from the lowest non-binder fiber content batch to the highest non-binder fiber content batch with the batches combined in that order. Such progressive increase in content may well have a tendency to strengthen the composite product, due to less variation in the fiber content between the various cards which go to make up the product. Such progressive structure will also tend to be more flexible.

Naturally the proportions of the two general types of fibers used will be varied in accordance with the requirements of the final product desired, it being only esesntial to include a sufficient percentage of the binder fibers in the batches to give necessary strength and stability to the final adhesive tape desired. Beyond this point the proportion of binder fibers may be increased to anything desired. In fact, for some purposes an entire layer of a product may be composed of a single binder fiber, or of mixtures of different kinds of binder fibers. A wider range of adhesive tape products, however, is obtainable by using such mixtures as those above described, and by judiciously selecting and proportioning the fibers and adapting the steps of the process to the results desired, such characteristics as strength and pliability, and the relative porosity of the opposing surfaces of the backing can be readily controlled and predetermined. Oftentimes the external surfaces of the backing may be of the same character, with the internal structure less dense.

In addition to the possibility of choosing fibers for imparting certain chemical or physical characteristics to the back surface of the tape or certain physical characteristics for mechanical adhesive anchorage on the interface surface, the fibers may be chosen to afford chemical interface characteristics especially effective in securing a good adhesive bond, especially necessary where the adhesive is to have pressure-sensitive characteristics. The choice of particular binder fibers of varying chemical structure may therefore depend to a large extent upon the type of adhesive mass contemplated for use with the backing material. In the preferred example given, where cellulose binder fibers are used, a rubber or rubber substitute type of pressure-sensitive adhesive is indicated, for such an adhesive will have less affinity for the predominantly cellulose acetate back surface than would an adhesive composed of plasticized cellulosic ingredients, and more affinity for the non-binder cotton fiber.

On the other hand, the backing may have as the binder fiber a polyvinyl ester fiber, in which case the adhesive may comprise either the rubber-resin or rubber substitute-resin type of adhesive, or a plasticized cellulosic pressure-sensitive adhesive, preferably milled and calendered onto the sheet backing, though the adhesive may, if desired, be solvent-spread.

Or, the back surface binder fibers may be of one kind—say polyvinyl acetate—and the other surface binder fibers may be of a different kind—say ethyl cellulose or cellulose acetate—the content of the succesive cards throughout the web being varied to secure this result. The adhesive may then be a polyvinyl compound, plasticized to pressure-sensitivity, and will have firm adhesion when applied to the predominantly polyvinyl acetate surface. Where solvent spreading of the adhesive is contemplated, the predominant fibers adjacent the interface surface on which the adhesive is united may well be of a character that they are partially or wholly soluble in the solvent for the adhesive mass, and/or are compatible with the plasticizers present in the adhesive mass. The compatability of the interface backing fibers with the plasticizers for the adhesive is equally effective in the case of non-solvent spread adhesive masses, as the compatible adhesive plasticizer may well have such action on the interface fibers as to secure a better adhesion. Where aqueous spreading of the adhesive mass is contemplated, the fibers on the interface surfaces may be predominantly water-wettable for similar reasons, whereas the opposite surface may constitute substantially entirely non-water-wettable fibers.

One example of a transparent, pressure-sensitive rubber type adhesive which may be calendered to the preferred form of cellulose actate, cotton fiber backing, is the following:

| | Parts by weight |
|---|---|
| Vistanex (isobutylene polymer) | 0.5 |
| Rubber (highly plasticized) | 4.5 |
| Hydrogenated glycerol abietate | 2.5 |
| Hydrogenated methyl abietate | .25 |
| Wax | .15 |
| Anti-oxidant | .008 |

Where solvent spreading is to be resorted to rather than calendering, straight vistanex masses may be used, such as the following:

| | Parts by weight |
|---|---|
| Vistanex medium | 10. |
| Hydrogenated methyl abietate | 1. |
| Hydrogenated rosin | 5. |
| Wax | 1.5 |

This adhesive may be spread with a suitable solvent, such for instance as toluene.

Of course, regular well known rubber-rosin pressure-sensitive adhesives may be used.

While the differential surface characteristics are, in the main, relied upon to secure good interface adhesion and resistance to picking when unrolling, the different character of the surfaces may be enhanced by further mechanical or chemical treatments. Crinkling, creping, embossing or coating operations, or a combination thereof, may be resorted to. For instance, a plasticized, moisture-proof transparent film of cellulose acetate or nitro-cellulose may be applied either by frictioning or solvent spreading, or might be applied simultaneously with an embossing operation. On rubber coatings, such as chlorinated rubber or rubber hydrochloride, may be applied where the pressure-sensitive adhesive is to be of a cellulosic nature.

Embossing alone, however, is highly effective, for the tape is inherently embossible into a permanently thermo-set configuration which can be obtained both on the external back surface and on the interface. Such embossing or other surface irregularity on the back is an aid in reducing adhesion of a pressure-sensitive mass when the tape is rolled on itself, due to less surface contact. Irregularity on the interface is also an aid in securing interface adhesion by providing more surface area for adhesion, and, where the mass is of uniform thickness on the irregular interface surface, the amount of surface contact of the mass against even a smooth back-surface when the tape is rolled upon itself, is reduced.

Likewise, the backing structure may be subjected to ordinary cloth crinkling or creping processes prior to application of the adhesive, or the tape may be prepared in accordance with a process claimed in a co-pending application of Ziegler & Hoeglund, Serial No. 725,424, to secure a combined crepe in the adhesive and in the backing. In the case of tapes of this invention, the crepe may become permanently thermo-set by application of sufficient heat during the creping process to soften thermoplastic fibers present in the backing and reset them to maintain the tape in a creped configuration with permanent undulations.

Oftentimes the application of a coating of transparent material will act to accentuate the transparency of the tape as a whole. Where it is desired to provide a tape which is transparent in the sense that it does not conceal writing or designs on the surface to which it is applied, various expedients can be resorted to. For instance, transparent non-binder fibers, as well as transparent binder fibers, having approximately the same index of refraction, may be utilized. A transparent adhesive may thus be spread on the backing, with the adhesive being chosen with due regard to its index of refraction, which should approach as nearly as possible that of the fibers. Likewise, any transparency heightening back film, such as a suitable plasticized lacquer, should have an index of refraction essentially the same as that of the fibers.

This sheet backing material herein described is related to the product and processes described in a co-pending application of Reed, Serial No. 303,021, filed November 6, 1939. These processes contribute toward the possibility of making unique pressure-sensitive adhesive tapes for special uses and with special new properties as a whole, in accordance with this invention.

I claim:

1. A flexible textile sheet material comprising a mixture of intimately intermingled textile fibers having binder and non-binder characteristics adherently bonded together into a flexible unwoven web by the binder characteristics of the binder fibers, said binder and non-binder fibers occurring in predetermined different proportions on opposite surfaces of said web, whereby said material presents different surface characteristics.

2. An adhesive sheet material including a flexible sheet backing comprising a mixture of intimately intermingled unspun textile fibers having binder and non-binder characteristics adherently bonded together into a flexible unwoven web by the binder characteristics of the binder fibers, one surface of said web having a preponderance of said binder fibers as compared with the remainder of said web, and a pressure-sensitive adhesive mass united with the other surface.

3. An adhesive sheet material including a flexible sheet backing comprising a mixture of intimately intermingled unspun fibers having binder and non-binder characteristics adherently bonded together into a flexible unwoven web by the binder characteristics of the binder fibers, said binder and non-binder fibers occurring in predetermined different proportions adjacent opposing surfaces of said web, and a pressure-sensitive adhesive coating on one surface of said backing.

4. An adhesive sheet material including a flexible sheet backing comprising a mixture of intimately intermingled unspun fibers having binder and non-binder characteristics adherently bonded together into a flexible unwoven web by the coalescent characteristics of the binder fibers, one kind of said fibers occurring in predetermined increasing proportion progressively from one surface to the opposing surface of said web, and a pressure-sensitive adhesive coating on one surface of said backing.

5. An adhesive sheet material including a flexible sheet backing comprising a mixture of thermoplastic and non-thermoplastic fibers adherently bonded together into a flexible unwoven web by coalescence of said thermoplastic fibers at intersecting points, said fibers occurring in predetermined different proportions adjacent opposing surfaces of said web, and a pressure-sensitive adhesive coating on one surface of said backing.

6. An adhesive sheet material including a flexible sheet backing comprising a mixture of intimately intermingled unspun fibers having binder and non-binder characteristics adherently bonded together into a flexible unwoven web by coalescence of said binder fibers at intersecting points, one surface of said web having a preponderance of said binder fibers and the other surface of said web having a preponderance of said non-binder fibers, and a pressure-sensitive adhesive mass united with the latter surface.

7. An adhesive sheet material including a flexible sheet backing comprising a mixture of intimately intermingled unspun fibers having thermoplastic and non-thermoplastic characteristics adherently bonded together into a flexible unwoven web by coalescence of said thermoplastic fibers at intersecting points, one surface of said web having a preponderance of said thermoplastic fibers and the other surface of said web having a preponderance of said non-thermoplastic fibers, and a pressure-sensitive adhesive mass united with the latter surface.

8. An adhesive sheet material including a flexible sheet backing of a textile product composed essentially of a mixture of intimately intermingled unspun textile fibers having binder and non-binder characteristics adherently bonded together into a flexible unwoven web by coalescence of said binder fibers at intersecting points, one surface of said web having non-porous smooth characteristics and the other surface of said web being relatively porous and having loose fiber ends protruding promiscuously therefrom, and a pressure-sensitive adhesive mass united with the relatively porous surface.

9. An adhesive sheet material including a flexible sheet backing of a textile product composed essentially of unspun non-thermoplastic non-binder textile fibers and thermoplastic binder fibers so distributed throughout the product that said non-binder fibers occur in predominant concentration internally of said product and said binder fibers occur in predominant concentration on a surface of said product, the binder fibers uniting the mass of fibers by coalescence at intersecting points into a coherent unitary structure, and an adhesive mass united therewith.

10. An adhesive sheet material including a flexible sheet backing of a textile product composed essentially of non-binder textile fibers and cellulose acetate binder fibers intermingled with each other in an unspun relationship, said fibers being united into a flexible structure by the coalescence of the cellulose acetate fibers with each other at their points of intersection and by their engagement with the non-binder fibers, said structure having a preponderance of said cellulose acetate fibers adjacent one surface thereof and a preponderance of said non-binder fibers adjacent the opposite surface thereof, and a pressure-sensitive adhesive coating on the latter surface.

11. An adhesive sheet material including a flexible sheet backing of a textile product composed essentially of unspun non-binder textile fibers and plasticized thermo-plastic binder fibers so distributed throughout the product that said non-binder fibers occur in predominant concentration adjacent one surface and said plasticized binder fibers occur in predominant concentration adjacent the other surface, the binder fibers uniting the mass of fibers by coalescence at intersecting points into a coherent unitary structure, and an adhesive mass plasticized with the same plasticizer as that present in said binder fibers, united with said predominantly non-binder textile fiber surface.

12. An adhesive sheet material including a flexible sheet backing of a textile product composed essentially of non-binder unspun textile fibers and plasticized thermo-plastic binder fibers so distributed throughout the product that said non-binder fibers occur in predominant concentration adjacent one surface and said plasticized binder fibers occur in predominant concentration adjacent the other surface, the binder fibers uniting the mass of fibers by coalescence at intersecting points into a coherent unitary structure, and an adhesive mass united therewith on said predominantly non-binder fiber surface.

13. As a sheet backing material for adhesives, a textile product composed essentially of textile fibers of different types, one type of said fibers being binder fibers having latent coalescent properties, another type being non-binder fibers and both kinds of fibers being bonded together by the coalescent characteristics of the binder fibers and being secured thereby in a relatively fixed relationship to each other, said binder fibers occurring in materially greater proportion adjacent one surface of said backing than adjacent the other surface, whereby said material presents different surface characteristics.

14. As a backing for adhesives, a flexible sheet material comprising a mixture of fibers having binder and non-binder characteristics, the binder fibers having a normally latent capacity for coalescence with the non-binder fibers and uniting the fibers of the mass by coalescence into a unitary, coherent structure, said binder fibers occurring in materially higher proportion adjacent one surface of said backing than adjacent the other surface, whereby said material presents different surface characteristics.

15. A creped adhesive sheet material including a flexible sheet backing comprising a mixture of thermoplastic and non-thermoplastic fibers bonded together into a flexible unwoven web by coalescence of said thermoplastic fibers, said fibers occurring in predetermined different proportions adjacent opposing surfaces of said web, and an adhesive coating on one surface of said backing, the combined structure having coextensive crepings.

RAYMOND E. REED.